United States Patent Office 3,563,696
Patented Feb. 16, 1971

3,563,696
**SEPARATION OF $CO_2$ AND $H_2S$
FROM GAS MIXTURES**
Homer E. Benson, Pittsburgh, Pa., assignor to
Benson, Field and Epes, a copartnership
Continuation-in-part of application Ser. No. 804,247,
Mar. 4, 1969. This application June 17, 1969, Ser.
No. 834,066
Int. Cl. B01d 47/00
U.S. Cl. 23—2                                   23 Claims

ABSTRACT OF THE DISCLOSURE

A process of improved thermal efficiency and lower capital cost for separating $CO_2$ and/or $H_2S$ from gas mixtures using a regenerable aqueous alkaline scrubbing solution which is circulated in a cyclic process between absorption and regeneration stages. In the absorption stage, at least a portion of the solution reaches a temperature above the atmospheric boiling temperature of the regenerated solution. In the regeneration stage at least two separate regeneration zones are used operating at different temperatures and correspondingly different pressures. The higher temperature, higher pressure regeneration zone is supplied with solution from the absorption stage which is at a temperature above the atmospheric boiling temperature of the regenerated solution, while the lower temperature, lower pressure regeneration zone is supplied with a separate stream of solution. Stripping steam for the lower temperature regeneration zone is generated by reducing the pressure on the hot regenerated solution from the higher temperature regeneration zone. The process permits the effective utilization of the heat content of hot feed gases and the heat of absorption of the acid gases, which heat sources have been in previous practice largely wasted.

---

This application is a continuation-in-part of copending application Ser. No. 804,247 filed Mar. 4, 1969, by Homer E. Benson for Separation of $CO_2$ and $H_2S$ From Gas Mixtures.

This invention relates to the separation of $CO_2$ and $H_2S$ from gas mixtures.

Many highly important industrial processes require the removal of large quantities of $CO_2$ and $H_2S$ from gas mixtures containing these slightly acidic gases. Synthesis gas ($N_2+H_2$) used in the production of synthetic ammonia, or hydrogen for use in hydrogenation processes, or hydrogen-carbon monoxide mixtures used as towns gas, or for the Oxo-synthesis process, or for methanol synthesis, or the like, are commonly produced by the stream-reforming (followed by water-gas shift) of natural gas or naphtha. Alternatively, they may be made by the partial oxidation of natural gas, naphtha, hydrocarbon oils, or solid fuels such as coal. These reforming, or partial oxidation, processes produce raw gas mixtures containing from about 15% to 35% $CO_2$. All or most of the $CO_2$ must be removed before the product gases can be used for their intended purposes. The capital cost of the $CO_2$ separation plant and the cost of its operation are both significant factors in the overall economics of producing ammonia synthesis gas, hydrogen, $H_2CO$ mixtures, and the like by these processes.

Of rapidly increasing importance also is the processing of natural gas deposits which may contain high percentages of $CO_2$ and $H_2S$ which must be removed before the gas is fit for use. Here again, the capital cost of the plant for separating these constituents and the cost of its operation is a significant factor in determining the cost of the purified natural gas product.

The most widely accepted industrial processes for the separation of $CO_2$ and $H_2S$ involve the use of regenerable aqueous alkaline scrubbing solutions such as aqueous ethanolamine or potassium carbonate solutions which are continuously circulated between an absorption zone where acid gases are absorbed and a regeneration zone where they are desorbed usually by steam-stripping. In such scrubbing processes, the capital cost of the scrubbing plant is controlled, of course, by the size of the equipment required, particularly the size of the absorption and regeneration towers (which, of course, is determined by the quantity of packing or the number of contacting trays required to carry out the absorption and desorption operations), the size of the reboilers for generating stripping steam, and the size of the condensers which condense spent stripping steam so that condensate may be returned to the system to maintain proper water balance. The cost of operating such scrubbing plants is related principally to their thermal efficiency; that is, the amount of heat required for the removal of a given amount of acid gas, sometimes expressed, for example, as cubic feet of acid gas removed per pound of steam consumed.

In accordance with the present invention, a new process has been discovered utilizing regenerable aqueous alkaline scrubbing solutions which produces markedly increased thermal efficiency, and which may also, in some cases, provide substantial reductions in the capital cost of the scrubbing plant. As will be apparent from the detailed description which follows, the new process makes possible the effective utilization of heat sources that in prior processes are largely or completely wasted, including particularly the heat of absorption of the acid gases in the scrubbing solution and the heat introduced into the system by the gas mixture being treated as it comes into direct contact with the scrubbing solution. These heat sources, through the process of the invention, are effectively utilized to generate a portion of the stripping steam needed to regenerate the scrubbing solution.

According to the new process of the invention, a regenerable aqueous alkaline scrubbing solution is circulated in a cyclic process between an adsorption stage wherein the gas mixture is scrubbed by the solution at substantial superatmospheric pressures and a regeneration stage where the solution is steam-stripped at substantially reduced pressures to desorb acid gas from the solution. The absorption stage is operated at least in part a temperatures above the atmospheric boiling temperature of the regenerated solution, and at least a portion of the solution is withdrawn from the absorption stage at such temperature. In the regeneration stage, there is established at least two separate regeneration zones wherein solution from the absorption stage is steam-stripped to desorb acid gas therefrom at pressures substantially less than the pressures in the absorption stage. One of the regeneration zones is maintained as a higher pressure, higher temperature zone operating at superatmospheric pressure (and thus at temperature aboves above the atmospheric boiling temperature of the regenerated solution), and is supplied with hot solution from the absorption stage at a temperature above the atmospheric boiling temperature of the regenerated solution. Another of the regeneration zones is maintained as a lower pressure, lower temperature zone supplied with a separate stream of solution from the absorption stage. The regenerated solution leaving the higher pressure regeneration zone, at a temperature above its atmospheric boiling temperature, is conducted to a flashing tank or equivalent pressure reduction zone where pressure is released on the solution resulting in the flashing off to steam and the cooling of the solution. The flashed steam released in this manner is introduced into the lower pressure regeneration zone as stripped steam while the cooled, regenerated solution from the flashing zone, and the regenerated solution from the lower temperature regeneration zone are returned to the absorption zone.

As will be apparent from the detailed description which follows, the process of the invention may be applied to various gas separation problems in a variety of ways. The selection of the optimum process scheme for applying the invention will depend upon a number of factors, such as the temperature and water vapor content of the gas mixture to be treated, the partial pressure of the acid gas in the mixture, and the desired degree of purity of the treated gas. A number of specific embodiments are described herein, illustrating the application of the invention under various conditions. It will be apparent that many other variations are possible within the scope of the invention.

For a more detailed description of the invention, reference is now made to the accompanying drawings wherein FIG. 1 is a diagrammatic flow sheet illustrating one embodiment of the invention adapted for the treatment of hot feed gases.

Figure 1:
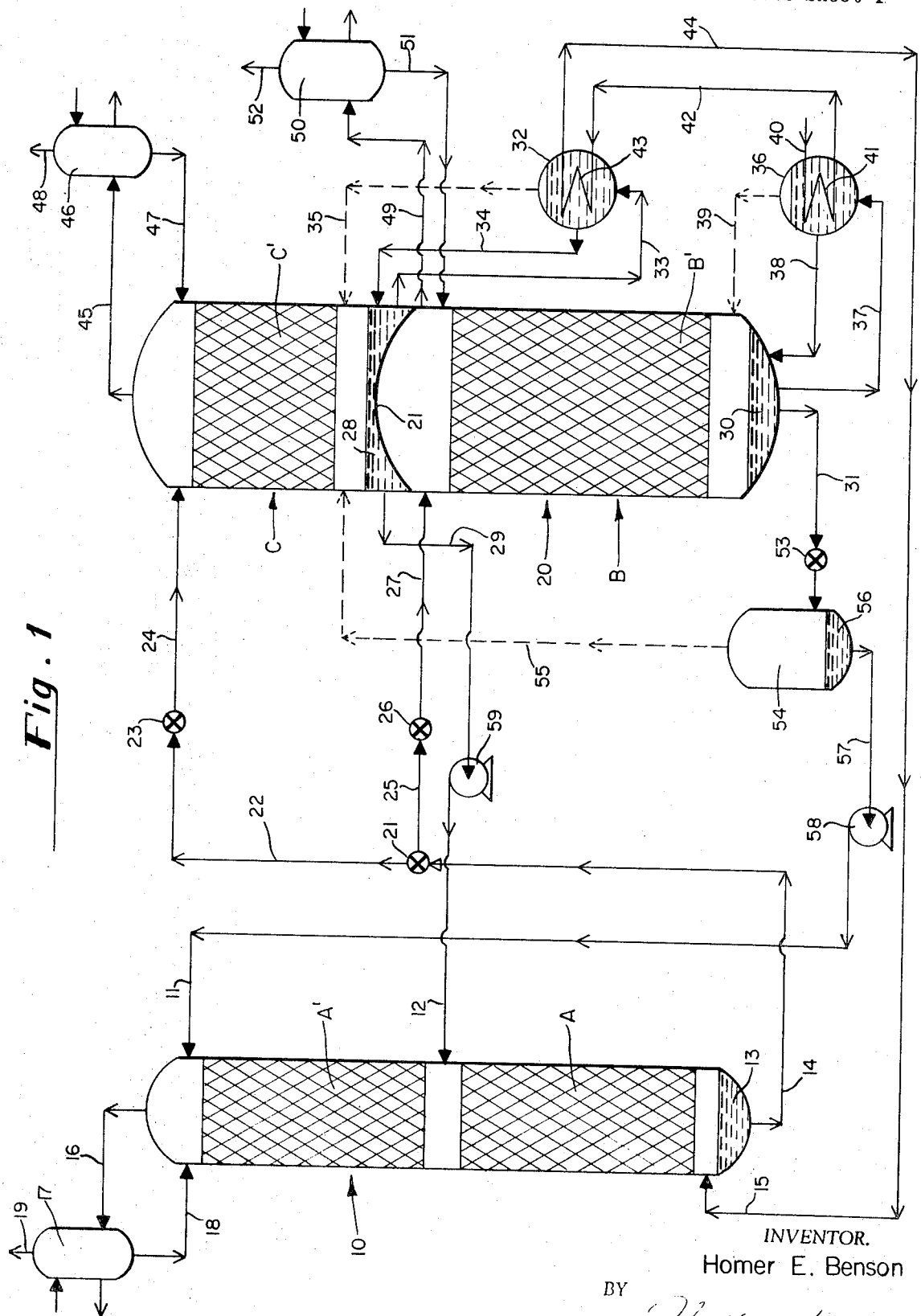

Reference is now made in FIG. 1 which shows a system suited for the treatment of a hot gas stream where it is desired to reduce the residual $CO_2$ content down to moderately low levels such as 0.5% to 2% residual $CO_2$. In FIG. 1, the reference numeral 10 refers generally to an absorber column designed to operate under substantial superatmospheric pressures. The absorber column 10 is provided in a cross-hatched sections designated as A and A', respectively, with means for insuring intimate contact between the gas and liquid phases so as to achieve intimate gas-liquid contact. Thus, sections A and A' may be provided with a suitable packing material such as Raschig rings, Berl saddles, Intalox saddles, or other types of packing bodies exposing large surface areas of liquid to the gas stream flowing through the packing. Other means such as plates equipped with bubble caps or sieve trays may be employed alternately.

The absorber column 10 is supplied with a regenerated stream of scrubbing solution, such as an aqueous potassium carbonate solution, by lines 11 and 12. Line 11 delivers a stream of scrubbing solution (which is preferably more highly regenerated than that entering through line 12) to the top of the absorber column and this stream flows down over the packaing in section A'. Line 12 delivers a second stream of scrubbing solution (which is normally less thoroughly regenerated than the stream entering by line 11) above section A. The solution introduced by line 11 mixes with that introduced by line 12 and the mixed solution then flows down over packing or plates in section A and collects at the bottom of the absorber tower in sump 13, and is removed from the absorber tower by line 14.

The gas stream to be purified, containing $CO_2$ and/or $H_2S$, enters the bottom of absorber tower 10 by line 15 and flows upwardly countercurrently to the descending liquid through sections A and A', and leaves the top of the absorber in a purified condition through line 16. If desired or necessary, the gas stream leaving the absorber by line 16 is passed through a cooler-condenser 17 where the gas is cooled and water vapor is condensed. The aqueous condensate from condenser 17 may be returned to the top of the absorber by line 18. The purified gas passes out of the cooler-condenser by line 19 for any desired use.

Regeneration of the solution occurs in the regeneration column generally designated by the reference numeral 20. In the regeneration stage embodied in the column 20, there are two separate zones. At the bottom of the regeneration column there is provided a higher temperature, superatmospheric pressure regeneration zone generally designated by the letter B and a lower pressure, lower temperature regeneration zone provided at the top of the regeneration column 20 generally designated by the letter C. The higher temperature, higher pressure zone B is separated from the lower pressure, lower temperature zone C by a dome 21, preventing communication between the two zones. Zone B is provided with suitable packing or plates in cross-hatched section B', and zone C is similarly provided with plates or packing in cross-hatched section C'.

Spent scrubbing solution, containing absorbed acid gas, is withdrawn from sump 13 at the bottom of absorber tower 10 by line 14 and conducted to flow control valve 21 where the stream is divided into two portions. One portion flows by line 22, pressure letdown valve 23 and line 24 to the top of the lower pressure regeneration zone C while a second portion flows by line 25, pressure letdown valve 26 and line 27 to the top of higher pressure regeneration zone B. Typically, 40% to 70% of the solution withdrawn from the bottom of the absorber by line 14 may be sent to the higher pressure zone B, while the remainder flows to the lower pressure regeneration zone C.

Solution introduced into the top of zone C flows downwardly over trays or packing in section C' countercurrently to upwardly flowing stripping steam, collects in sump 28 at the bottom of zone C, and is withdrawn by line 29.

Solution introduced into the top of higher pressure zone B by line 27 flows downwardly over packing or plates in section B' countercurrently to upwardly flowing stripping steam, collects in sump 30 at the bottom of zone C and is withdrawn by line 31.

Zone C of the regeneration stage is supplied with stripping steam partly by reboiler 32 through which scrubbing solution from sump 28 is circulated by lines 33 and 34. Steam generated in reboiler 32 is introduced into the bottom of zone C by line 35.

Higher pressure zone B of the regenerator is supplied with stripping steam by reboiler 36 through which scrubbing solution from sump 30 is circulated by lines 37 and 38. Steam generated in reboiler 36 is introduced into the bottom of zone B by line 39. Reboilers 36 and 32 in the embodiment illustrated in FIG. 1 are heated by raw process gas which may be, for example, a hot, $CO_2$-containing gas saturated with water vapor from a steam-reforming or partial oxidation system. The hot process gas enters reboiler 36 by line 40, transfers heat to the scrubbing solution through coil 41, and then passes by line 42 to reboiler 32 where it transfers heat to the scrubbing solution through coil 43, leaves reboiler 32 by line 44, and is fed into the bottom of the absorber 10 by line 15.

The mixture of desorbed acid gas and steam collecting at the top of regeneration zone C is withdrawn by line 45, passes through condenser 46 where sufficient steam is condensed out to maintain the proper water balance in the system, and aqueous condensate is refluxed back into the top of regeneration zone C by line 47. The gaseous effluent from the condenser, consisting largely of acid gas, is removed by line 48.

The mixture of steam and desorbed gas collecting at the top of regeneration zone B is removed by line 49, and passed through condenser 50 where steam is condensed and sufficient condensate refluxed to maintain the proper water balance, and aqueous condensate is refluxed back into the top of regeneration zone B by line 51. The gaseous effluent from the condenser, consisting largely of acid gas, is removed by line 52.

The regenerated solution collecting in sump 30 at the bottom or regeneration zone B is at a temperature above the atmospheric boiling temperature of the solution as a result of the superatmospheric pressure prevailing in zone B. This hot, regenerated solution from sump 30 is withdrawn by line 31, passes through pressure letdown valve 53, and is introduced into flash vessel 54 where the pressure is reduced to approximately that prevailing in the lower pressure, lower temperature regeneration zone C. As a result of the reduction in pressure, steam is evolved from the solution and the evolved steam is conducted by line 55 to the bottom of regeneration zone C to serve as stripping steam. If, for example, zone B is operated at a pressure of 15 pounds per square inch gage while zone C is operated at a pressure of 2 pounds per square inch gage (as measured at the bottom of zone C), the pressure in the flash tank 54 may be e.g. 3 pounds per square inch gage, and the steam generated will then travel under its own head into the bottom of zone C by line 55. It is thus apparent that zone C is supplied with its stripping steam requirements in the embodiment shown in FIG. 1 partly by steam generated in reboiler 32 and partly by flash steam evolved in flash tank 54.

The evolution of steam in flash vessel 54 is, of course, endothermic and results in cooling of the solution. The cooled solution collecting at the bottom of vessel 54 in sump 56 is conducted by line 57, recycle pump 58 and line 11 to the top of the absorption column 10.

The regenerated solution collecting at the bottom of regeneration zone C in sump 28 is withdrawn by line 29 and recirculated by recycle pump 59 and line 12 to absorption column 10 at an intermediate level above section A.

EXAMPLE 1

The operation of the system of FIG. 1 will now be described for a typical application involving the treatment of a $CO_2$-containing hot feed gas to provide a purified gas having a residual $CO_2$ content of 0.8%. The raw feed gas, produced by the reforming of natural gas followed by water-gas shift, is introduced by line 40 into coil 41 or reboiler 36 at a temperature of 167° C. and a pressure of 398 p.s.i.g. (pounds per square inch gage) and saturated with steam (a portion of the heat from the gas leaving the shift reactor having been recovered in heat recovery systems upstream of reboiler 36). After passing through coil 41, the gas leaves the reboiler at a temperature of 129.4° C. The 71,950 pounds per hour of steam generated in reboiler 36 is fed by line 39 to higher pressure regeneration zone B, furnishing the steam-stripping requirements for this zone.

The process gas flows by line 42 through coil 43 of reboiler 32, leaving at a temperature of 115° C. Steam at the rate of 13,370 pounds per hour is generated in reboiler 32 and is fed by line 35 into lower pressure regeneration zone C to furnish a portion of the steam-stripping requirements of that zone.

The raw feed gas containing 18.33% $CO_2$ (on a dry basis) flows by line 15 at the rate of 5,200,000 cubic feet per hour (dry basis) and containing 16,750 pounds per hour of water vapor. The raw gas enters absorber column 10 by line 15 at a temperature of 155° C. and a pressure of 389 p.s.i.g. This gas mixture flows upwardly countercurrently to descending scrubbing solution in sections A and A' of the absorber, and leaves the top of the absorber by line 16. The scrubbing solution employed is a 30% by weight aqueous solution of potassium carbonate containing 3% by weight of diethanolamine. One portion of the scrubbing solution from the lower pressure regeneration zone C is introduced by line 12 into the absorber at a temperature of 105° C. and a flow rate of 121,000 gallons (U.S. gallons) per hour. The scrubbing solution introduced by line 12 is in a moderately regenerated condition, having a potassium bicarbonate fraction of 45%.[1]

The second portion of the scrubbing solution from the higher pressure regeneration zone B is introduced at the top of the column by line 11 at a temperature of 112.5° C. and at a flow rate of 136,200 gallons per hour. This portion of the solution is more thoroughly regenerated, having a potassium bicarbonate fraction of 33%.

In section A of the absorber, the bulk of the $CO_2$ is removed. The gas stream flowing into section A' contains 3.9% $CO_2$ while the purified gas stream leaving the top of the absorber by line 16 contains 0.8% $CO_2$.

As a result of the heat transferred from the hot, saturated gas stream in direct contact with the solution and the heat released by the exothermic heat of absorption of $CO_2$ in the solution, the scrubbing solution collecting at the bottom of the absorber in sump 13 is heated to a temperature of 117.9° C., above the atmospheric boiling temperature of the solution in its regenerated condition. The spent scrubbing solution at a temperature of 117.9° C. and having a potassium bicarbonate fraction of 81% flows through line 14 at a flow rate of 2,900,000 pounds per hour, and is divided into two streams by flow control valve 21. One stream flows at the rate of 1,362,000 pounds per hour through line 22, pressure letdown valve 23 and line 24 to the top of lower pressure regeneration zone C, and a second portion flows at a rate of 1,538,000 pounds per hour through line 25, pressure letdown valve 26 and line 27 to the top of higher pressure regeneration zone B.

Lower pressure regeneration zone C operates at a pressure of 2 p.s.i.g. at the top of packed section C' and 4 p.s.i.g. at the bottom of the packing above sump 28. In zone C, the solution is subjected to stripping steam introduced by lines 35 and 55, and is withdrawn at the bottom of zone C at a temperature of 105° C. and at a potassium bicarbonate fraction of 45%.

Higher pressure regeneration zone B is operated at a pressure of 15 p.s.i.g. at the top of packed section B', the pressure at the bottom of the packing being 18 p.s.i.g. due to pressure drop through the packing. The solution flowing down over packed section B' is subjected to steam-stripping by steam introduced by line 39 and collects in sump 30 at the bottom of zone B at a temperature of 127° C. and at a potassium bicarbonate fraction of 33%. This hot, regenerated solution, after passing through pressure letdown valve 53, is introduced into flash tank 54 operated at a pressure of 5.7 p.s.i.g. As the solution enters flash tank 54 above its atmospheric boiling temperature, substantially pure steam is evolved from the solution at the rate of 30,100 pounds per hour. Very little $CO_2$ is evolved since the $CO_2$ content of the solution has been stripped to a low level in regeneration zone B. The steam evolved in flash tank 54 travels under its own pressure through line 55 to the bottom of re-

---

[1] The "potassium bicarbonate fraction," as used herein, means the proportion of original potassium carbonate ($K_2CO_3$) expressed in percent which has been converted to potassium bicarbonate by reaction with $CO_2$. For example, a solution having a potassium bicarbonate fraction of 25% is obtained by the conversion of 25 mol percent of the potassium carbonate content of the solution to potassium bicarbonate such that the ratio of potassium ions present as potassium carbonate to potassium ions present as potassium bicarbonate is 3 : 1. Since two mols of potassium bicarbonate are produced for each mol of potassium carbonate, the mol ratio of $$K_2CO_3 : KHCO_3$$

at a 25% bicarbonate fraction is 3 : 2.

generation zone C where it furnishes 69.3% of the stripping-steam requirements for regeneration zone C.

The flashed solution which collects at the bottom of tank 54 is cooled to a temperature of 112.5° C. and is recirculated by recycle pump 58 to the top of the absorption column.

The overall effect of the system of FIG. 1, as illustrated by Example 1, is the recovery and effective utilization of a substantial portion of the heat content of the raw gas entering the absorber plus a substantial portion of the heat of absorption evolved as the acid gas is absorbed in the solution. In previous systems both of these sources of heat have been completely or largely wasted. In the system of FIG. 1, the scrubbing solution in the absorber acts, in effect, as an accumulator of the heat content of the raw process gas (which is transferred to the solution by direct contact with the gas) and of the heat of absorption of the acid gas liberated in the absorber. Heat from these two sources raises the temperature of the scrubbing solution to a level above the atmospheric boiling temperature of the regenerated solution.

By regenerating a substantial portion of this hot scrubbing solution in a superatmospheric-pressure regeneration zone, there is produced a lean, regenerated solution at an elevated pressure. When the pressure is released on this solution, as in flash tank 54 in FIG. 1, in effect the heat accumulated in the solution during absorption is released in the form of useful stripping steam containing little or no $CO_2$ and at a pressure such that it may be fed into the bottom of the lower pressure regeneration zone C and utilized in zone C as effective stripping steam, replacing a substantial proportion of the stripping steam that would otherwise have to be produced in reboiler 32.

In Example 1 it will be noted that 30,100 pounds per hour of stripping steam is generated in flash tank 54 through flashing of the regenerated solution from the higher pressure regeneration zone B. This internally generated steam reduces the amount of external steam required in the system (as measured by the total amount of steam which ordinarily would be generated in reboilers 32 and 36) by approximately 20%. This reduction in external steam requirements also reduces the size of the reboilers 32 and 36 which are an expensive part of the plant since they must often be constructed of stainless steel. Overhead condensers 46 and 50 are also substantially reduced in size in proportion to the reduction in the amount of steam generated in reboilers 32 and 36.

Still other advantages result from the fact that a substantial proportion of the solution is regenerated at superatmospheric pressures. The higher operating temperatures which result from the superatmospheric regeneration pressure substantially increase the rate of desorption and make possible more thorough regeneration of the solution and reduction in the amount of packing in sections A and A' of the absorber and sections B' and C' of the regenerator. In Example 1, an overall reduction of about 13% in the volume of packing in these sections (and a corresponding reduction in the size of the absorber and regenerator towers) is made possible by virtue of the higher regeneration pressure employed in regeneration zone B. A further advantage is that a substantial proportion (60% in Example 1) of the $CO_2$ separated from the ray gas is recovered at elevated pressure (15 p.s.i.g. in Example 1), thereby reducing compression costs in cases where the $CO_2$ is to be utilized under pressure, such as for the manufacture of urea or for conversion to liquid or solid $CO_2$.

Two features of the invention essential for obtaining these results should be emphasized. First, it is essential that at least a portion of the absorber be operated at temperatures above the atmospheric boiling temperature of the regenerated solution [2] so that at least a substantial portion of the spent solution is sent to the regeneration stage at such elevated temperature. If spent scrubbing solution is sent to the higher pressure regeneration zone at a lower temperature, the thermal efficiency of the higher pressure regeneration zone becomes quite poor because of the additional heat required to increase the temperature of the scrubbing solution from its relatively low initial temperature to the relatively high solution temperature existing in the higher pressure regeneration zone. Under these circumstances, there is little or no net gain in thermal efficiency.

The second essential feature of the invention is that the hot stream of spent solution must be fed to the higher pressure regeneration zone without first being decompressed or let down to a pressure less than that prevailing in the higher pressure zone. If the hot stream of spent solution from the absorber is decompressed to atmospheric pressure, the heat accumulated in the solution is dissipated as a useless mixture of steam and $CO_2$ having no stripping value. When, on the other hand, the hot, spent solution is decompressed to the pressure prevailing at the top of the higher pressure regeneration zone, it has been found that the wasteful flashing of steam on pressure letdown is minimized. In other words, the pressure prevailing in the higher pressure regeneration zone very markedly reduces the highly endothermic steam evolution which occurs on pressure letdown, thus conserving the heat stored in the solution. This conservation of heat is reflected by a substantially higher solution temperature at the top of the higher pressure regeneration zone following pressure letdown. After regeneration, this stored heat then becomes available upon flashing of the solution to produce essentially pure steam, virtually free of acid gas and fully effective as stripping steam.

In order to store heat in the scrubbing solution to produce a stream of spent scrubbing solution having a temperature above the atmospheric boiling temperature of the regenerated solution, it is necessary, of course, to avoid excessive cooling of the scrubbing solution fed to the absorber. In the system of FIG. 1, a minimum of solution cooling occurs. Except for the endothermic cooling that occurs in flash tank 54, all of the solution is returned to the absorber at the temperature it leaves the regenerator.

Figure 2:
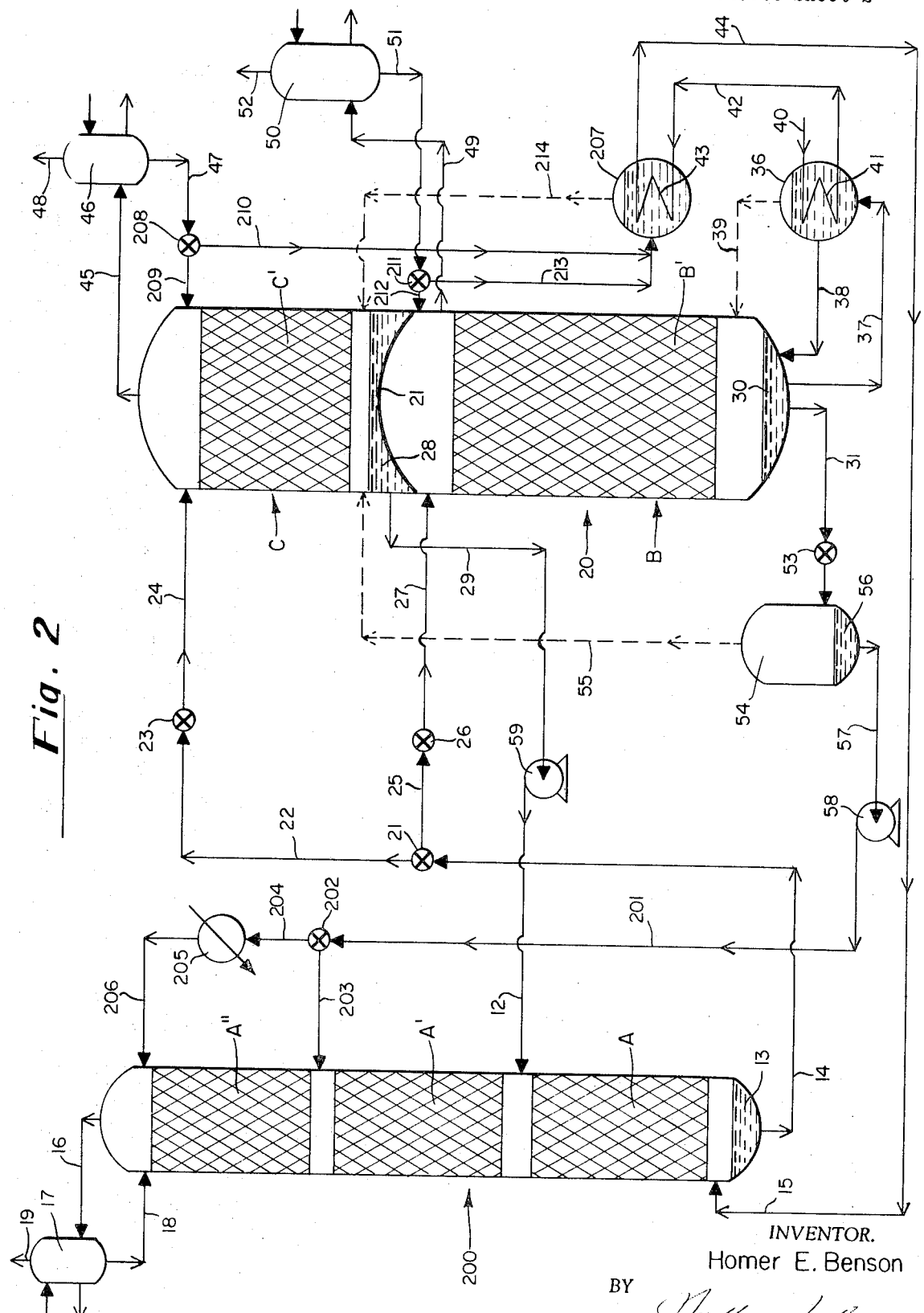
FIG. 2 is a diagrammatic flow sheet illustrating another embodiment of the invention adapted for the treatment of hot feed gases which is particularly suitable for producing a purified gas with low residual acid gas content.

In some cases it may be desirable to provide for moderate cooling of the regenerated solution at the top portion of the absorber in order to reduce the back pressure of acid gas from the solution, and thereby obtain a purified gas stream with a lower residual content of acid gas. Such a system is illustrated in FIG. 2 where a minor, cooled stream of solution is fed to the top of the absorber to achieve lower acid gas content in the purified gas. Where cooling does take place, as in the system of FIG. 2, the amount of cooling should, of course, be controlled to permit at least a substantial portion of the scrubbing solution to be heated in the absorber to a temperature above the atmospheric boiling temperature of the regenerated solution.

Figure 3:
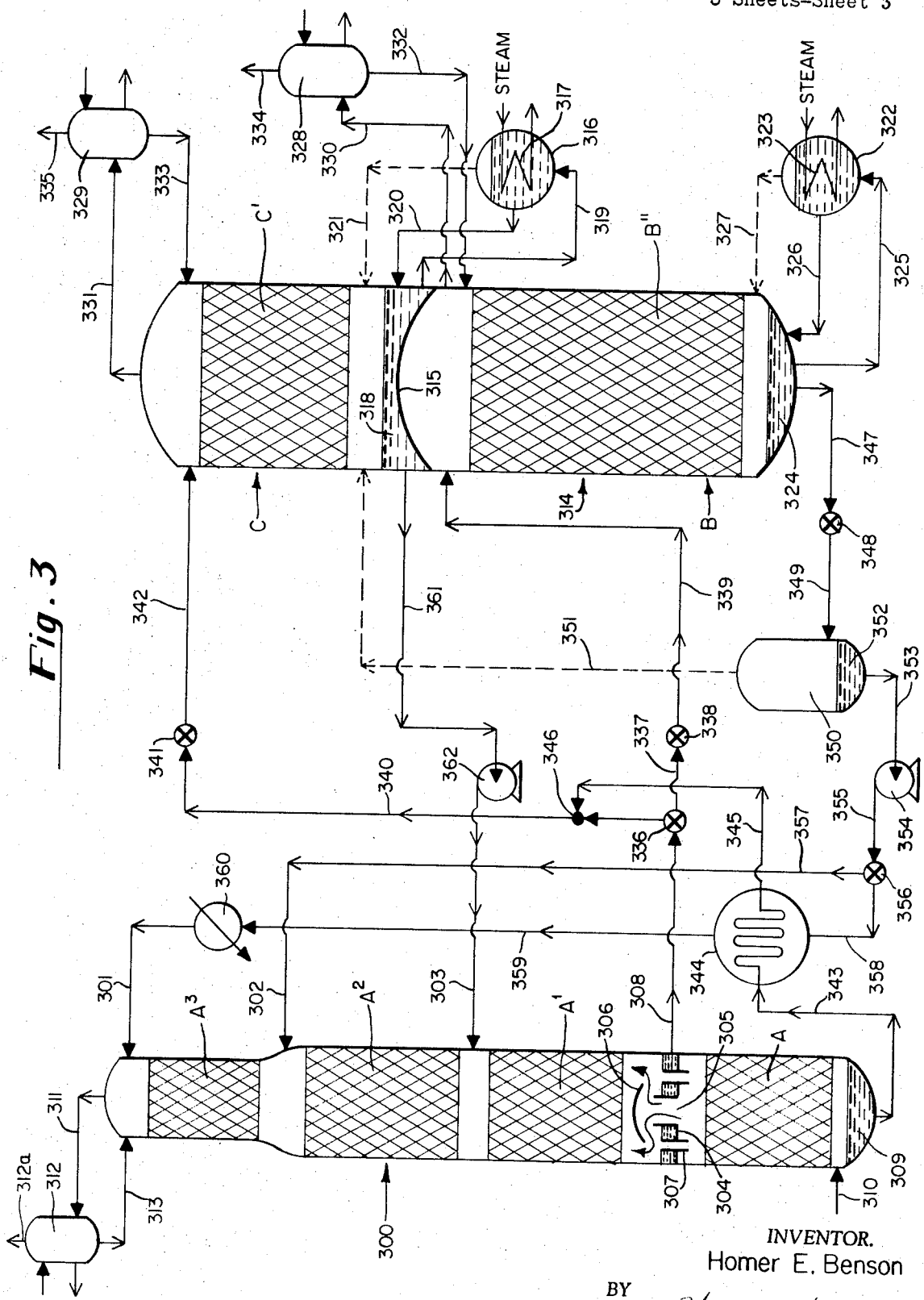
FIG. 3 is a diagrammatic flow sheet illustrating another embodiment of the invention adapted for the treatment of cool feed gases, and where it is desired to reduce the residual content of acid gas to a low level in the purified gas stream.

In order to obtain a high-temperature stream from the absorber, it will sometimes be desirable to divide the absorption stage into separate sections or zones in order to insure that at least a portion of the spent scrubbing solution will leave the absorption stage at the desired elevated temperature. Such a system suitable for handling a cool fed gas is illustrated in FIG. 3. In FIG. 3, the lowest section of the absorber operates as a preheater and presaturator section which operates at a substantially cooler

---

[2] The "atmospheric boiling temperature of the regenerated solution," as used herein, means the temperature at which the total pressure of water vapor and acid gas over the scrubbing solution, after being subjected to regeneration by steam-stripping in the regeneration stage, is equal to one atmosphere absolute. Prior to regeneration, the solution will have a somewhat lower atmospheric boiling temperature because of the presence of a relatively high content of absorbed acid gas.

temperature than the remainder of the system. By segregating the scrubbing solution in this cool section of the absorber, it becomes possible to operate other sections of the absorber at temperatures above the atmospheric boiling temperature of the regenerated solution.

A particularly advantageous system operating in accordance with this invention and employing separate absorption zones operating at different temperatures is described and claimed in the copending application of Homer E. Benson, Ser. No. 804,247, filed Mar. 4, 1969, entitled Separation of $CO_2$ and $H_2S$ From Gas Mixtures. In the system of that application, by using separate absorption zones supplied with separate parallel streams of scrubbing solution which are separately withdrawn from the absorption zones, the heat content of the raw gas stream and the heat liberated by the exothermic absorption reaction is, in effect, concentrated in a high-temperature stream which is fed to the higher pressure, higher temperature regeneration zone, thereby maximizing heat recovery from these two sources.

The temperature reached in any given case by the hot stream of solution from the absorber depends on a number of factors, such as the temperature and degree of saturation of the incoming raw gas, the partial pressure of $CO_2$ and/or $H_2S$ in the raw gas, the amount of cooling, if any, to which the scrubbing solution is subjected, and the particular arrangement of the system, particularly as to whether the absorber is zoned to concentrate heat in a particular stream as in FIG. 3, or as in the embodiments described and claimed in copending application Ser. No. 804,247 referred to above. In some cases, as in Example 3, although the temperature of the hot stream from the absorber may be only a few degrees higher than the atmospheric boiling temperature of the regenerated solution, significant improvement in thermal economy may be achieved. In typical cases, the temperature of the hot stream from the absorber will reach temperatures which are from 5° C. to 45° C., but more usually from 10° C. to 30° C. higher than the atmospheric boiling temperature of the regenerated solution.

Suitable raw feed gases for the invention should preferably contain a substantial partial pressure of acid gas ($CO_2$ and/or $H_2S$). In general, the higher the partial pressure of acid gas, the greater the advantages obtained. In most cases, it will be desirable that the partial pressure of acid gas in the raw feed gas be of the order of 25 pounds per square inch or higher, and preferably of the order of 40 pounds per square inch or higher. Relatively high acid gas partial pressures are desirable in order to overcome the relatively high back pressure of acid gas from the solution which results from the fact that a portion of the absorber is operated at temperatures above the atmospheric boiling temperature of the regenerated solution. Under these conditions, a substantial partial pressure of acid gas in the gas phase is required to provide the needed driving force [3] for absorption to take place.

While the invention is applicable both to cool and hot feed gases, ideal feed gases for the system of the invention are those which are substantially higher in temperature than the atmospheric boiling temperature of the regenerated scrubbing solution and which contain substantial quantities of, or preferably are saturated with, water vapor. Synthesis gases produced by the high-pressure reforming of natural gas or naphtha, or by the partial oxidation of various carbonaceous fuels under pressure, are ideal for treatment in accordance with the invention since they are available at high temperatures, contain relatively high partial pressures of $CO_2$ (e.g. of the order of 50 to 400 pounds per square inch) and contain substantial quantities of, or are saturated with, water vapor. After recovery of most of the heat content of these hot, steam-containing gases in various heat recovery units (including reboilers furnishing stripping steam for the regeneration stage), such gases will typically be introduced into the absorption stage of the system of the invention saturated with steam and at temperatures of the order of 115° C. to 135° C.

Typical cool feed gases suitable for treatment in accordance with the invention include natural gas feedstocks at elevated pressures and containing $CO_2$ and/or $H_2S$ in substantial quantities. The application of the invention to the removal of $CO_2$ from natural gas is shown in FIG. 3 of the drawings and illustrative Example 3.

In general, any regenerable aqueous alkaline scrubbing solution may be employed in the system of the invention. Particularly preferred are aqueous solutions of potassium carbonate, particularly relatively concentrated potassium carbonate solutions having potassium carbonate concentrations by weight of 15% to 45%, and preferably from about 22% to 35% (these concentrations by weight being calculated on the assumption that all the potassium present is present as potassium carbonate). Such potassium carbonate solutions are preferably activated by the addition of additives such as ethanolamines, alkali metal borates such as potassium or sodium borate, $As_2O_3$, amino acids such as glycine, or other additives which tend to increase the rates of absorption and desorption of acid gas in the potassium carbonate solution.

Particularly preferred among these activators for potassium carbonate solutions are the ethanolamines which are preferably added to the potassium carbonate solutions in amounts ranging from about 1% to 10% by weight, and preferably from about 2% to 6% by weight. Diethanolamine, $HN(CH_2CH_2OH)_2$, is preferred from the standpoints of cost, relatively low volatility, and effectiveness. However, monoethanolamine, $$H_2NCH_2CH_2OH,$$

or triethanolamine, $N(CH_2CH_2OH)_3$, may also be employed in place of diethanolamine, or mixtures of any two or three of these ethanolamines may be employed as additives to potassium carbonate solutions.

In addition to the potassium carbonate solutions, with or without activators, other regenerable aqueous alkaline scrubbing solutions may be employed such as aqueous solutions of the ethanolamines or aqueous solutions of the alkali metal phosphates such as potassium phosphate.

As is well known, the reactions occurring during absorption and regeneration differ depending upon the particular scrubbing solution employed. In the case of potassium carbonate, the absorption of $CO_2$ produces potassium bicarbonate while regeneration or desorption releases $CO_2$, producing potassium carbonate. As is also well known, the reversible absorption and desorption reactions do not go to completion in either the absorption or regeneration stages, and consequently the scrubbing solution, as circulated, is actually a mixture. In the case of potassium carbonate solutions, for example, the regenerated scrubbing solution fed to the absorber in the case of $CO_2$ absorption is a carbonate-bicarbonate mixture rich in carbonate while the solution leaving the absorber is a mixture rich in bicarbonate. References herein to scrubbing solutions of potassium carbonate, ethanolamines, potassium phosphate are, of course, intended to include mixtures of these compounds with the reaction products formed during the absorption process.

The absorption stage should be maintained at substantial superatmospheric pressures of at least 100 pounds per square inch gage, and preferably 200 pounds per square inch gage. Absorber pressures in typical applications of the invention will generally range from 250 to 1500 pounds per square inch gage.

It is desirable, of course, in the absorption stage to utilize close to the full practical carrying capacity of the solution since the thermal efficiency drops off and the required solution circulation rate increases if only a portion of the available solution carrying capacity is utilized.

---
[3] The difference between the back pressure of acid gas from the solution and the partial pressure of acid gas in the gas phase.

Thus, for example, when utilizing an aqueous potassium carbonate solution to absorb $CO_2$, it is desirable to employ a solution in the absorption stage which has been regenerated to a relatively lean potassium bicarbonate fraction of from, for example, 25% to 40%, and to maintain a rich potassium bicarbonate fraction leaving the absorption stage of, for example, 65% to 85%.

The pressure in the higher pressure, higher temperature regeneration zone will generally be in the range of from 5 to 40 pounds per square inch gage, and more usually in the range of from 10 to 30 pounds per square inch gage. As explained previously, a superatmospheric regeneration pressure is required to conserve the heat accumulated in the solution and to prevent it from being dissipated as a useless mixture of steam and $CO_2$, having no stripping value, which would occur if the hot solution from the absorber were reduced to atmospheric pressure before regeneration. A practical limitation of the maximum pressure in the higher pressure regeneration zone is the amount of flash steam that can be utilized to advantage in the lower pressure regeneration zone. The higher the pressure in the higher pressure regeneration zone, the greater the amount of flash steam that will be produced as the pressure on the solution is reduced in the flash tank prior to recirculation of the solution to the absorber.

The lower pressure, lower temperature regeneration zone is preferably maintained at or slightly above atmospheric pressure. Slightly elevated pressures of e.g. from one pound to 6 pounds per square inch gage (as measured at the top of the regeneration zone) may sometimes be necessary or desirable in view of pressure drops through the overhead condenser, or the desirability of supplying $CO_2$ under slight pressure to a process downstream from the regenerator. Optimum thermal efficiency, however, is obtained when the lower pressure regenerator is operated as close as possible to atmospheric pressure to provide the maximum pressure differential between the higher and lower pressure regeneration zones.

The proportion of scrubbing solution fed to the higher temperature regeneration zone relative to that fed to the lower temperature regeneration zone may vary considerably depending upon factors such as the type of heat source available for regeneration, the temperature and acid gas content of the raw gas, the desired degree of purity of the treated gas, the amount of acid gas to be recovered under pressure and the like. Generally, however, the proportion of solution fed to the high temperature regeneration zone should comprise a substantial proportion, generally not less than about 30% nor more than 80% of the total, and in most typical cases should comprise from about 40% to 70% of the total solution flow. If the flow to the higher pressure regeneration zone is reduced to a low level, the amount of hot, regenerated solution suitable for flashing is reduced, thus minimizing the amount of heat recovery possible. If, on the other hand, the flow to the higher pressure regeneration zone is increased to an excessively high level, more flashing steam may be generated than can be usefully employed in the lower pressure regeneration zone.

Reference is now made to FIG. 2 which illustrates another embodiment of the invention which is particularly suited for the treatment of hot feed gases where it is desired to produce a purified gas with low residual acid gas content, such as a gas with a residual $CO_2$ content of e.g. 0.05 to 0.2 volume percent.

All elements in FIG. 2 which are equivalent to those in FIG. 1 have been given the same reference numeral or reference letter, and accordingly it will be necessary only to refer to the differences between the system of FIG. 1 and FIG. 2.

The principal differences between the system of FIG 1 and FIG. 2 is that in the system of FIG. 2 a portion of the solution from the higher pressure regeneration zone B (more thoroughly regenerated than the regenerated solution from the lower pressure regeneration zone C) is subjected to a substantial amount of cooling and then introduced into the top of the absorption column. By providing cooled, more thoroughly regenerated scrubbing solution at the top of the absorber tower, the back pressure of acid gases from the solution at the top of the absorber is minimized, thus permitting the acid gas content in the purified gas to be reduced to low levels.

Referring now specifically to FIG. 2, the absorber tower referred to generally by the reference numeral 200 is provided with three sections containing suitable packing or contact plates designated by the reference letters A, A' and A''. The top two sections of the absorber A'' and A' are supplied with regenerated scrubbing solution leaving the bottom of higher pressure, higher temperature regeneration zone B by line 31. After passing through pressure letdown valve 53, flash tank 54, line 57 and recycle pump 58, the regenerated solution is conducted by line 201 to flow control valve 202 where it is divided into two portions, one flowing by line 203 into the absorber column above section A' and the other flowing by line 204, cooler 205 and line 206 into the top of the absorber above section A''. As in FIG. 1, less thoroughly regenerated solution from the lower pressure regeneration zone C is introduced by line 29, recycle pump 59 and line 12 into the lower portion of the absorber above section A.

In the operation of the system of FIG. 2, the cooled, more thoroughly regenerated solution entering the top of the absorber by line 206 will generally be a minor proportion (e.g. of the order of 10% to 40%) of the total solution circulating in all zones of the absorber tower. When using potassium carbonate scrubbing solutions, particularly those containing activators, the stream entering the top of the absorber will often be cooled to a temperature generally of the order of 50° C. to 90° C., and often preferably to a temperature of 60° C. to 80° C.

Another difference between the systems of FIGS. 1 and 2 is the arrangement of the reboilers which provide stripping steam for regeneration zones B and C. In FIG. 1, the stripping steam for both zones B and C is raised by heating the scrubbing solution in the reboilers 32 and 36.

In FIG. 2, on the other hand, stripping steam for regeneration zone B is raised in reboiler 36 by heating scrubbing solution, whereas stripping steam for regeneration zone C is raised by heating aqueous condensate produced in the system. Thus, regeneration zone C is provided with a condensate-fed reboiler 207. The supply of aqueous condensate to reboiler 207 may be derived from either or both of overhead condensers 46 and 50. Condensate is removed from condenser 48 by line 47 and is passed through flow control valve 208 which splits the flow between lines 209 (which returns a portion of the condensate to the top of regeneration zone C) and line 210 (which feeds a portion of the condensate to reboiler 207). Similarly, condensate leaving reboiler 50 by line 51 may be split into two portions by flow control valve 211 which splits the flow between line 212 (which feeds a portion of the condensate to the top of regeneration zone B) and line 213 (which feeds a portion of the condensate to reboiler 207). The relative amounts of condensate supplied to reboiler 207 from condensers 46 and 50 will, of course be determined by the overall water balance in the system. Steam raised in condensate reboiler 207 is fed by line 214 to regeneration zone C.

It will be noted in the system of FIG. 2 that reboilers 36 and 207 are heated by hot process gas which enters coil 41 of reboiler 36 by line 40, and then flows in series by line 42 through the condensate-fed reboiler 207 supplied with reboiler coil 43.

If desired, the relative positions of the two reboilers may be reversed. That is, reboiler 36 (the first reboiler to receive the hot process gas) may be a condensate-fed reboiler while the second reboiler in series, namely reboiler 207, may be instead supplied with scrubbing solution.

EXAMPLE 2

The operation of the system of FIG. 2 is illustrated by the following typical example. A hot, saturated gas stream produced by the pressure reforming and water-gas shift of natural gas, intended for ammonia synthesis and containing about 18% $CO_2$, about 61% hydrogen, about 20% nitrogen, and minor amounts of carbon monoxide and methane, is introduced by line 40 into reboiler coil 41 of reboiler 36 at a temperature of 173° C., saturated with water vapor, and at a pressure of 398 p.s.i.g. Steam raised in reboiler 36 at the rate of 85,000 pounds per hour is introduced into zone B by line 39. The gas stream then flows by line 42 at a temperature of 136° C. into reboiler coil 43 of condensate-fed reboiler 207. The 17,170 pounds per hour of steam raised in reboiler 207 is introduced into lower pressure regeneration zone C by line 214. The process gas then flows by line 44 at a temperature of 120° C. and is introduced at this temperature and at a pressure of 389 p.s.i.g. into the bottom of absorber column 200 by line 15. The raw gas flows into the bottom of the absorber at the rate of 5.19 million normal cubic feet per hour (dry basis) containing 18.3% $CO_2$ and 19,900 pounds per hour of water vapor. This gas stream flows upwardly countercurrent to descending scrubbing solution introduced into the absorber by lines 12, 203, and 206, consisting of a 30% by weight potassium carbonate aqueous solution containing 3% by weight of diethanolamine.

Cooled, thoroughly regenerated solution from the higher pressure regeneration zone B, having a bicarbonate fraction of 30% and at a temperature of 70° C., is introduced at the top of the column by line 206 at the rate of 66,330 gallons per hour. A second stream of scrubbing solution also from regeneration zone B, having a bicarbonate fraction of 30% and at a temperature of 113.5° C., is introduced by line 203 above section A' at the rate of 66,330 gallons per hour. A third stream of scrubbing solution from the lower pressure regeneration zone C is introduced into the column by line 12 above section A at a temperature of 105° C., a bicarbonate fraction of 45%, and a flow rate of 132,660 gallons per hour.

In packed sections A and A' of the absorber, the bulk of the $CO_2$ is removed. The gas stream flowing into packed section A" contains 1.0% $CO_2$ while the purified gas stream leaving the top of the absorber by line 16 contains 0.1% $CO_2$.

Lower pressure regeneration zone C operates at a pressure of 2 pounds per square inch gage at the top of packed section C' and at a pressure of 4 pounds at the bottom of sump 28. In zone C, the solution is subjected to stripping steam introduced by lines 214 and 55, and is withdrawn at the bottom of zone C at a temperature of 105° C. and at a potassium bicarbonate fraction of 45%.

Higher pressure regeneration zone B is operated at a pressure of 15 p.s.i.g. at the top of packed section B', the pressure at the bottom of the packing being 18 p.s.i.g. due to pressure drop through the packing. The solution flowing down over packed section B' is subjected to steam-stripping by steam introduced by line 39 and collects in sump 30 at the bottom of zone B at a temperature of 128° C. and at a potassium bicarbonate fraction of 30%. This hot, regenerated solution, after passing through pressure letdown valve 53, is introduced into flash tank 54 operated at a pressure of 6 p.s.i.g. As the solution enters flash tank 54 above its atmospheric boiling temperature, substantially pure steam is evolved from the solution at the rate of 29,250 pounds per hour. Very little $CO_2$ is evolved since the $CO_2$ content has been stripped to a low level in regeneration zone B. The steam evolved in flash tank 54 travels under its own pressure through line 55 to the bottom of regeneration zone C where it furnishes 63% of the stripping-steam requirements for regeneration zone C. The flashed solution which collects at the bottom of tank 54 is cooled to a temperature of 113.5° C. and is recirculated by recycle pump 58 and line 201 to flow control valve 202 where it is split into two equal streams, one flowing by line 203 without cooling into the absorption column above packed section A', and the second stream flowing by line 204 through cooler 205 where it is cooled to 70° C. and then by line 206 into the top of the absorber tower above packed section A".

The advantages of the system of FIG. 2 can be appreciated by comparison of the results obtained in Example 2 with the results obtained in a prior system utilizing the same feed gas, the same scrubbing solution, and producing a purified gas of the same purity, but in which only one regeneration zone is employed, operating at atmospheric pressure. In the prior system, as in Example 2, the absorber tower is supplied with cooled (70° C.), more thoroughly regenerated solution at the top of the tower, and with hotter, moderately regenerated solution entering the absorber tower at an intermediate point. The results of such a comparison are shown in the table below:

|  | Single absorption and regeneration zones | Example 2 | Percent change |
|---|---|---|---|
| Net regeneration efficiency (cubic feet of $CO_2$ removed per pound of steam consumed). | 7.5 | 9.35 | 20% higher regeneration efficiency. |
| Total reboiler duty (B.t.u./hour) | 120,000,000 | 96,000,000 | 20% decrease in outside steam requirements. |
| Total scrubbing solution flow rate (gallons/hour) | 299,000 | 265,320 | 11% less solution flow. |
| Cooling duty—solution cooler cooling minor stream to top of absorber (B.t.u./hour). | 50,200,000 | 42,000,000 | 16% decrease in cooling duty. |

The scrubbing solution collecting at the bottom of absorber 200 in sump 13 is at a temperature of 114.3° C. as a result of the heat transferred from the hot, saturated gas stream (entering at 120° C.) in direct contact with the solution, and the heat released by the exothermic heat of absorption of $CO_2$ in the solution. The spent scrubbing solution at a temperature of 114.3° C. and having a potassium bicarbonate fraction of 80% flows through line 14 at the rate of 3,000,000 pounds per hour, and is divided into two equal streams by flow control valve 21. One stream flows at the rate of 1,500,000 pounds per hour through line 22, pressure letdown valve 23, and line 24 to the top of lower pressure regeneration zone C, and a second portion flows at the same rate through line 25, pressure letdown valve 26 and line 27 to the top of higher pressure regeneration zone B.

In addition to the above, the system of FIG. 2 in contrast to prior practice, provides a 16% savings in the total amount of packing in the regeneration zone, and a 12% decrease in the amount of packing required in the absorber. Furthermore, in the system of FIG. 2, 59% of the $CO_2$ is recovered at a pressure of 15 p.s.i.g. whereas in the prior system, all of the $CO_2$ is recovered at atmospheric pressure.

Reference is now made to FIG. 3 which shows a system particularly adapted for the treatment of a cool feed gas, for example a stream of $CO_2$-containing natural gas entering the absorber at ambient temperature. In the system of FIG. 3, the absorption stage is provided with a first section which serves to preheat and pre-saturate the cool gas. The spent solution from the first section of the absorber, which has been cooled to a relatively low temperature by the cool, incoming gas mixture, is indirectly heat-exchanged with hot, regenerated solution and is then conducted to the lower temperature, lower pressure regeneration zone.

Using this arrangement, it is possible to maintain other portions of the scrubbing solution at a temperature somewhat above the atmospheric boiling temperature of the regenerated solution which, as previously explained, is necessary to achieve good thermal efficiency in the operation of the higher pressure, higher temperature regeneration zone.

Referring now specifically to FIG. 3, reference numeral 300 refers generally to an absorber column adapted to operate at substantially superatmospheric pressures and is provided in the cross-hatched sections designated as A, $A^1$, $A^2$ and $A^3$, with means for insuring intimate contact between the gas and liquid phases such as packing or contact plates.

Absorber column 300 is supplied with three streams of regenerated solution through lines 301, 302, and 303, respectively. Solution introduced by line 301 flows down over packing or plates in section $A^3$, mixing with regenerated solution introduced by line 302. The mixture flows down over packing or plates in section $A^2$. Regenerated solution introduced by line 303 mixes with the solution from the upper portion of the column and the mixture then flows down over packing or plates in section $A^1$.

Below section $A^1$, a collector plate 304 is provided upon which solution from the upper portion of the absorber collects. Collector plate 304 is provided with a chimney 305 permitting gas from section A to flow upwardly through the absorber, as shown by the arrows. Deflector cap 306 is provided to prevent solution from flowing down through chimney 305. Collector plate 304 is also provided with downcomers 307. A portion of the liquid collecting on plate 304 is withdrawn from the absorber by line 308 while a portion overflows into downcomers 307 into the lower portion of the absorber and, after flowing over packing or contact plates in section A, collects in sump 309 at the bottom of the absorber.

The cool gas stream entering the bottom of the absorber through line 310 flows upwardly countercurrently to descending solution through section A, upwardly through chimney 305, and thence successively through section $A^1$, $A^2$, and $A^3$ countercurrently to regenerated solution introduced through lines 303, 302, and 301, respectively, and leaves the top of the absorber through line 311 in a purified condition. If desired or necessary, the gas stream leaving the absorber by line 311 is passed through a cooler-condenser 312 where water vapor is condensed out. The aqueous condensate from cooler-condenser 312 may be returned to the top of the absorber by line 313. The purified gas passes out of the condenser by line 312a for any desired use.

Regeneration of the solution occurs in the regeneration column generally designated by the reference numeral 314. As in the previous embodiments, the regeneration stage embodied in column 314 includes two separate zones, a higher temperature, superatmospheric pressure regeneration zone generally designated by the letter B and a lower pressure, lower temperature regeneration zone at the top of the regeneration column generally designated by the letter C. Zones B and C are separated by a dome 315 preventing communication between the zones. Zone B is provided with suitable packing or plates in cross-hatched section B' while zone C is similarly provided with packing or plates in cross-hatched section C'.

Zone C is supplied with stripping steam partly by reboiler 316 provided with a steam coil 317. Scrubbing solution from sump 318 is circulated through reboiler 316 by lines 319 and 320. Steam generated in reboiler 316 is introduced into the bottom of zone C by line 321. A substantial portion of the stripping-steam requirements for zone C is supplied by steam generated by flashing the regenerated solution from the higher pressure regeneration zone B as will explained below.

Higher pressure zone B of the regenerator is supplied with stripping steam by means of reboiler 322 supplied with coil 323. Scrubbing solution from sump 324 is circulated through reboiler 322 by lines 325 and 326. Steam generated in reboiler 322 is introduced into the bottom of zone B by line 327.

As in previous embodiments, regeneration zones B and C are provided with overhead condensers 328 and 329, respectively. The mixture of steam and acid gas from the top of zones B and C is conducted by lines 330 and 331, respectively, to the condensers while sufficient condensate to maintain proper water balance is refluxed into the top of zones B and C from the condensers by lines 332 and 333, respectively. The effluent from the condensers, consisting mostly of acid gas, is removed by lines 334 and 335, respectively.

A portion of the spent scrubbing solution, containing absorbed acid gas, collecting on plate 304 is withdrawn from the absorber by line 308 at a temperature somewhat above the atmospheric boiling temperature of the regenerated solution, and conducted to flow control valve 336 where it is split into two streams. One of these streams, which may comprise e.g. from 40% to 70% of the total flow in the system, is conducted by line 337, pressure letdown valve 338 and line 339 to the top of regeneration zone B. This portion of the solution then flows down over plates or packing B' and is subjected to countercurrent steam-stripping by means of steam introduced thorugh line 327, and collects in sump 324 at the bottom of zone B. A second portion of the spent scrubbing solution withdrawn by line 308 is conducted by line 340, pressure letdown valve 341 and line 342 to the top of regeneration zone C where it flows downwardly over plates or packing C' countercurrently to stripping steam, and the regenerated solution then collects in sump 318 at the bottom of zone C.

Spent scrubbing solution collecting at the bottom of absorber tower 300 in sump 309, which is at a relatively low tempearture because of the cooling effect of the cool stream of acid gas introduced by line 310, is conducted by line 343 to heat exchanger 344 where it undergoes indirect heat exchange with hot solution from regeneration zone B. The thus heated solution is then conducted by line 345 and is mixed at point 346 with solution flowing in line 340 and then flows, after passing through pressure letdown valve 341 and line 342, into the top of lower pressure regeneration zone C.

Regenerated scrubbing solution collecting in sump 324 of zone B (which has been subjected to more thorough regeneration than the solution in zone C) is withdrawn by line 347 and passes through pressure letdown valve 348 and line 349 to flash tank 350. Upon the reduction in pressure in flash tank 350 to approximately that prevailing in lower pressure regeneration zone C, steam is evolved from the solution which is conducted by line 451 to the bottom of regeneration zone C to serve as stripping steam.

Cooled solution collects at the bottom of flash vessel 350 in sump 352 and is conducted by line 353, recycle pump 354, and line 355 to flow control valve 356 where it is divided into two portions. One portion is conducted by lines 357 and 302 to the absorber where it is introduced above section $A^2$. A second portion flows by line 358 to heat exchanger 344 where it is subjected to indirect heat exchange with cool solution from the bottom of the absorber. The partially cooled solution leaving heat exchanger 344 is conducted by line 359 to a cooler 360 where the temperature is further reduced after which the cooled, thoroughly regenerated solution is introduced into the top of the absorber by line 301.

Regenerated scrubbing solution collecting in sump 318 of zone C (which has been subjected to a moderate degree of regeneration) is withdrawn by line 361 and returned by recycle pump 362 and line 303 to regeneration tower 300 above section A¹.

EXAMPLE 3

The operation of the system shown in FIG. 3 will now be described for a typical application in which the feed gas is natural gas at a temperature of 20° C. at a pressure of 1000 pounds per square inch gage (p.s.i.g.) containing 7% $CO_2$ (partial pressure of $CO_2$=70 pounds per square inch), and the remainder essentially methane. This mixture flows into the bottom of absorber tower 300 by line 310 at the rate of 4,167,000 cubic feet per hour.

The absorber column 300, operated at a pressure of 1000 p.s.i.g., is supplied with three streams of scrubbing solution consisting of an aqueous potassium carbonate solution containing 30% by weight of potassium carbonate and 3% by weight of diethanolamine. One stream of thoroughly regenerated scrubbing solution enters the top of the absorber through line 301 at a flow rate of 20,000 gallons per hour at a temperature of 70° C. A second stream of thoroughly regenerated solution enters the absorber through line 302 at a flow rate of 21,950 gallons per hour at a tempearture of 117.5° C.

A third stream of scrubbing solution, less thoroughly regenerated, enters the absorber through line 303 at a temperature of 106° C. and at a flow rate of 39,300 gallons per hour.

Scrubbing solution containing absorbed acid gases collects on collector plate 304 at a temperature of 109° C., the total flow to collector plate 304 being 81,250 gallons per hour. A portion of the liquid on collector plate 304 is withdrawn at a temperature of 109° C. by line 308 at a flow rate of 68,150 gallons per hour. A second portion overflows collector plate 304 through downcomers 307 at a flow rate of 13,100 gallons per hour which latter portion flows downwardly over packed section A counter-currently to the cool $CO_2$-containing natural gas introduced through line 310.

As a result of the countercurrent direct contact of the cool stream of natural gas with the scrubbing solution entering section A at a temperature of 109° C., the natural gas stream leaves section A through chimney 305 saturated with water vapor and at a temperature of 70° C. The stream of natural gas, thus heated and saturated, then flows upwardly through sections A¹, A², and A³, and leaves the top of the absorber column 300 by line 311 at a temperature of 70° C. and containing a residual $CO_2$ content of 0.1% by volume. Since the natural gas stream flowing into section A¹ by chimney 305 is saturated and at a temperature of 70° C. and leaves the top of the column saturated and at a temperature of 70° C., there is essentially no heating or cooling of the solution by the natural gas stream in sections A¹, A², and A³. However, heat is liberated in sections A¹, A², and A³ through the exothermic heat of absorption of the $CO_2$ in the scrubbing solution.

In section A and section A¹, the $CO_2$ content drops from 7% to 1.35%. At the top of section A², the $CO_2$ drops to 0.5%; and in the cool top section A³ of the absorber, the $CO_2$ is reduced to a final residual content of 0.1%.

Two streams of spent solution are withdrawn from the absorber. The principal stream is withdrawn by line 308 at a temperature of 109° C. (above the atmospheric boiling temperature of the regenerated solution) at a flow rate of 68,150 gallons per hour. The stream line 308 is split into two portions; one, at a rate of 41,950 gallons per hour, is passed through pressure letdown valve 338 and line 339 to the top of higher pressure regeneration zone B maintained at a pressure of 10.0 pounds per square inch gage (p.s.i.g.) at the top of zone B. A second portion of the stream from line 308 flows by line 340 at the rate of 26,200 gallons per hour through pressure letdown valve 341 and line 342 to the top of lower pressure regeneration zone C maintained at a pressure of 2 p.s.i.g. at the top portion of zone C.

A second, minor stream of scrubbing solution is withdrawn from the bottom of the absorber column by line 343 at a temperature of 58° C. (having been cooled by contact with the incoming cool natural gas) and at a flow rate of 13,100 gallons per hour. This stream is heat-exchanged with hot solution from the high pressure regeneration zone B, and is heated to a temperature of 97° C. and then flows by line 345 to be mixed at point 346 with solution in line 340 to produce a mixed-solution temperature of 105° C. for the stream of solution flowing by line 342 into the top of regeneration zone C.

In higher pressure regeneration zone B, the scrubbing solution is subjected to steam-stripping at a steam rate of 25,750 pounds per hour. Thoroughly regenerated solution collects at the bottom of zone B at a pressure of 12 p.s.i.g. and at a temperature of 122° C. The thoroughly regenerated solution at a flow rate of 41,950 gallons per hour flows through pressure letdown valve 348 and line 349 into flash tank 350 operated at a pressure of 5 p.s.i.g. Upon pressure letdown in flash vessel 350, steam is evolved at the rate of 2,610 pounds per hour which is passed by line 351 into the bottom of lower pressure regeneration zone C to serve as stripping steam.

The solution in sump 352 of flash tank 350 cools to 117.5° C. as a result of the endothermic release of steam, and then is conducted by line 353, recycle pump 354 and line 355 to flow control valve 356 where it is diveded into two portions. One portion flows by line 357 at the rate of 21,950 gallons per hour and at a temperature of 117.5° C. into the absorber by line 302. A second portion flows at the rate of 20,000 gallons per hour by line 358 to indirect heat exchanger 344, entering at a temperature of 117.5° C. and leaving at a temperature of 85° C. It then passes through line 359 to cooler 360, where it is further cooled to a temperature of 70° C., and enters the top of the tower at this temperature through line 301.

Solution entering the top of regeneration zone C at 105° C. flows downwardly through packing or plates C' counter-currently to stripping steam provided by line 351 at the rate of 2,610 pounds per hour and by steam raised in reboiler 316 at a steam rate of 10,050 pounds per hour. The moderately regenerated solution collects in sump 318 at a temperature of 106° C. (pressure below section C' is 4 p.s.i.g. due to pressure drop through section C'). The moderately regenerated solution is withdrawn from the bottom of zone C by line 361 at a temperature of 106° C. at a flow rate of 39,300 gallons per hour, and is returned by recycle pump 362 and line 303 to the absorber tower above section A¹.

In Example 3 it will be noted that by providing lower section A of the absorber, which acts as a preheater and presaturator for the cool inlet gas, it becomes possible to obtain a relatively high-temperature stream of solution (above the atmospheric boiling temperature of the solution in its regenerated condition) in the upper portion of the absorber. It will be noted that the gas stream entering at 20° C. leaves section A at 70° C. The cooling effect of the gas on the succeeding portions A¹, A², and A³ of the absorber is thus greatly diminished, such that the solution on collecting plate 304 reaches a relatively high temperature, suitable for introduction into the higher pressure, higher temperature zone B of the regenerator. Indirect heat exchange of the cooled solution from section A with hot, regenerated solution further increases the efficiency of the process in that it reduces the load on cooler 360 and, at the same time, increases the thermal efficiency of regeneration zone C by increasing the temperature of the stream of solution fed into zone C by line 342.

As a result of the useful stripping steam recovered in flashing tank 354, and the use of the preheater, presaturator section A with associated heat exchanger 344, the thermal efficiency of the system of FIG. 3, compared with known conventional systems, is increased by 20%, thus allowing a 20% reduction in outside energy requirements for providing stripping steam for the regeneration stage.

It is understood that other embodiments of the invention in addition to those specifically described and illustrated are included within the scope of the invention and that the invention is not limited to the specific embodiments described nor to any particular arrangement of equipment. It is also to be understood that the illustrative flow diagrams do not include all the auxiliaries or instrumentation required for practical operation of a commercial plant. Thus, for example, it will ordinarily be necessary to provide additional equipment such as separator, or knock-out, drums downstream from the reboilers and at other locations in the systems illustrated. It is intended, of course, that such auxiliaries and other items required by sound engineering practice but not specifically shown will be employed in the practical application of the systems illustrated.

I claim:

1. A method for removing acid gases of the group consisting of $CO_2$ and $H_2S$ from gas mixtures by the use of a cyclic process wherein an aqueous alkaline scrubbing solution which is regenerable by steam-stripping is circulated between an absorption stage wherein said gas mixture is scrubbed with said solution at substantial superatmospheric pressure of at least 100 pounds per square inch gage, and a regeneration stage wherein said solution is steam-stripped at substantially reduced pressures to desorb acid gas, comprising the steps of withdrawing at least a portion of said scrubbing solution from said absorption stage as a hot stream at a temperature above the atmospheric boiling temperature of the regenerated solution, establishing at least two separate regeneration zones wherein solution from said absorption stage is steam-stripped to desorb acid gas therefrom at pressures substantially lower than the pressure in said absorption stage, maintaining one of said regeneration zones as a higher pressure, higher temperature zone operating at superatmospheric pressure, supplying said higher pressure regeneration zone with solution from said absorption stage at a temperature above the atmospheric boiling temperature of the regenerated solution, maintaining another of said regeneration zones as a lower pressure, lower temperature regeneration zone supplied with a separate stream of solution from said absorption stage, reducing the pressure on the regenerated solution leaving said higher pressure regeneration zone, thereby flashing off steam and cooling said solution, feeding said flashed steam into said lower pressure regeneration zone as stripping steam, and returning the regenerated streams of solution from said higher pressure and lower pressure regeneration zones to said absorption stage.

2. A method in accordance with claim 1 in which the partial pressure of acid gas in said gas mixture is at least about 25 pounds per square inch.

3. A method in accordance with claim 1 in which the acid gas in said gas mixture is at least predominantly $CO_2$.

4. A method in accordance with claim 1 in which said gas mixture is a hot, steam-containing gas mixture whereby said scrubbing solution is heated above the atmospheric boiling temperature of the regenerated solution by direct contact with said hot, steam-containing gas mixture and by the heat of absorption of acid gas contained in said mixture.

5. A method in accordance with claim 1 in which said scrubbing solution comprises an aqueous solution of potassium carbonate.

6. A method in accordance with claim 1 in which said scrubbing solution is an aqueous solution of potassium carbonate containing an additive of the group consisting of ethanolamines, alkali metal borates, $As_2O_3$, and amino acids.

7. A method in accordance with claim 1 in which the pressure in said higher pressure regeneration zone is in the range of from 5 to 35 pounds per square inch gage.

8. A method in accordance with claim 1 in which the pressure in said higher pressure regeneration zone is in the range of from 10 to 30 pounds per square inch gage.

9. A method in accordance with claim 1 in which a minor portion of the regenerated solution is cooled and fed to the top of said absorption stage.

10. A method in accordance with claim 1 in which a more thoroughly regenerated portion of the regenerated solution is fed to the top of said absorption stage, while less thoroughly regenerated solution is fed to lower portions of said absorption stage.

11. A method in accordance with claim 1 in which a portion of the regenerated solution is fed to the top of the absorption stage at a lower temperature and in a more thoroughly regenerated condition than regenerated solution fed to the lower portions of said absorption stage.

12. A method in accordance with claim 1 in which the gas mixture is cool with respect to said scrubbing solution, and wherein said cool gas mixture is preheated and presaturated by direct contact with scrubbing solution in a separate section of said absorption stage.

13. A method for removing acid gases of the group consisting of $CO_2$ and $H_2S$ from gas mixtures by the use of a cyclic process wherein an aqueous alkaline scrubbing solution which is regenerable by steam-stripping is circulated between an absorption stage wherein said gas mixture is scrubbed with said solution at substantial superatmospheric pressure of at least 100 pounds per square inch gage, and a regeneration stage wherein said solution is steam-stripped at substantially reduced pressures to desorb acid gas, comprising the steps of withdrawing the scrubbing solution from said absorption stage as a hot stream at a temperature above the atmospheric boiling temperature of the regenerated solution, dividing said hot stream from said absorber into at least two streams, establishing at least two separate regeneration zones wherein solution from said absorption stage is steam-stripped to desorb acid gas therefrom at pressures substantially lower than the pressure in said absorption stage, maintaining one of said regeneration zones as a higher pressure, higher temperature zone operating at superatmospheric pressure, supplying said higher pressure regeneration zone with one of said hot streams of solution from said absorption stage at a temperature above the atmospheric boiling temperature of the regenerated solution, maintaining another of said regeneration zones as a lower pressure, lower temperature regeneration zone supplied with another of said separate streams of solution from said absorption stage, reducing the pressure on the regenerated solution leaving said higher pressure regeneration zone, thereby flashing off steam and cooling said solution, feeding said flashed steam into said lower pressure regeneration zone as stripping steam, and returning the regenerated streams of solution from said higher pressure and lower pressure regeneration zones to said absorption stage.

14. A method in accordance with claim 13 in which the partial pressure of acid gas in said gas mixture is at least about 25 pounds per square inch.

15. A method in accordance with claim 13 in which the acid gas in said gas mixture is at least predominantly $CO_2$.

16. A method in accordance with claim 13 in which said gas mixture is a hot, steam-containing gas mixture whereby said scrubbing solution is heated above the atmospheric boiling temperature of the regenerated solution by direct contact with said hot, steam-containing gas mixture and by the heat of absorption of acid gas contained in said mixture.

17. A method in accordance with claim 13 in which said scrubbing solution comprises an aqueous solution of potassium carbonate.

18. A method in accordance with claim 13 in which said scrubbing solution is an aqueous solution of potassium carbonate containing an additive of the group consisting of ethanolamines, alkali metal borates, $As_2O_3$, and amino acids.

19. A method in accordance with claim 13 in which the pressure in said higher pressure regeneration zone is in the range of from 5 to 35 pounds per square inch gage.

20. A method in accordance with claim 13 in which the pressure in said higher pressure regeneration zone is in the range of from 10 to 30 pounds per square inch gage.

21. A method in accordance with claim 13 in which a minor portion of the regenerated solution is cooled and fed to the top of said absorption stage.

22. A method in accordance with claim 13 in which a more thoroughly regenerated portion of the regenerated solution is fed to the top of said absorption stage, while less thoroughly regenerated solution is fed to lower portions of said absorption stage.

23. A method in accordance with claim 13 in which a portion of the regenerated solution is fed to the top of the absorption stage at a lower temperature and in a more thoroughly regenerated condition than regenerated solution fed to the lower portions of said absorption stage.

References Cited
UNITED STATES PATENTS

| | | | |
|---|---|---|---|
| 1,971,798 | 8/1934 | Shoeld | 23—3 |
| 2,886,405 | 5/1959 | Benson et al. | 23—3 |
| 3,101,996 | 8/1963 | Bresler et al. | 23—2 |
| 3,144,301 | 8/1964 | Mayland | 23—2 |

FOREIGN PATENTS

| | | | |
|---|---|---|---|
| 849,150 | 9/1960 | Great Britain | 23—2 |

EARL C. THOMAS, Primary Examiner